United States Patent
Hunter et al.

(10) Patent No.: US 9,169,011 B2
(45) Date of Patent: Oct. 27, 2015

(54) ROTOR WITH BLADES INCLUDING OUTER BLADE SHELL AND INNER STRUCTURAL MEMBER

(75) Inventors: David H. Hunter, Cheshire, CT (US); Ryan T. Casey, West Haven, CT (US); Francis E. Byrnes, White Plains, NY (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 702 days.

(21) Appl. No.: 13/231,600

(22) Filed: Sep. 13, 2011

(65) Prior Publication Data

US 2013/0064674 A1   Mar. 14, 2013

(51) Int. Cl.
B64C 27/473   (2006.01)
B64C 27/32   (2006.01)
B64C 27/33   (2006.01)
B64C 27/58   (2006.01)

(52) U.S. Cl.
CPC .............. *B64C 27/473* (2013.01); *B64C 27/32* (2013.01); *B64C 27/33* (2013.01); *B64C 27/58* (2013.01)

(58) Field of Classification Search
USPC ............ 416/131, 132 R, 135, 140, 144, 145, 416/234, 238, 239, 240, 248, 500
See application file for complete search history.

(56) References Cited

U.S. PATENT DOCUMENTS

| | | | |
|---|---|---|---|
| 2,584,663 A * | 2/1952 | Bensen | 416/147 |
| 3,261,407 A * | 7/1966 | Culver et al. | 416/112 |
| 4,087,203 A * | 5/1978 | Ferris | 416/141 |
| 4,403,918 A | 9/1983 | Schramm | |
| 4,616,977 A * | 10/1986 | Schramm | 416/138 |
| 4,676,720 A * | 6/1987 | Niwa et al. | 416/134 A |
| 4,681,511 A * | 7/1987 | Glatfelter | 415/131 |
| 4,714,450 A * | 12/1987 | Byrnes et al. | 464/90 |
| 4,792,280 A | 12/1988 | Olsen et al. | |
| 5,042,967 A | 8/1991 | Desjardins | |
| 5,110,260 A | 5/1992 | Byrnes et al. | |
| 5,113,713 A | 5/1992 | Isabelle et al. | |
| 5,228,834 A | 7/1993 | Yamamoto et al. | |
| 5,242,267 A | 9/1993 | Byrnes et al. | |

(Continued)

FOREIGN PATENT DOCUMENTS

WO   WO9611842 A1   4/1996
WO   WO9615029 A2   5/1996

(Continued)

OTHER PUBLICATIONS

EP Search Report for application EP12184205.8, dated Jan. 17, 2013, 7 pages.

*Primary Examiner* — Dwayne J White
*Assistant Examiner* — Justin Seabe
(74) *Attorney, Agent, or Firm* — Cantor Colburn LLP (57) ABSTRACT

A rotor for use in an aircraft includes an inner hub; and a plurality of blades arranged around the inner hub, each of the plurality of blades comprising an inner structural member; an outer blade shell surrounding the inner structural member; and a centering block located at a base of the inner structural member proximal to the inner hub, wherein the centering block is located between a first lateral portion of the inner structural member and a second lateral portion of the inner structural member, wherein the centering block is further connected to the outer blade shell, and wherein the centering block allows the outer blade shell to rotate about an axis approximately corresponding to the inner structural member.

21 Claims, 9 Drawing Sheets

(56) References Cited

U.S. PATENT DOCUMENTS

| | | | |
|---|---|---|---|
| 5,304,036 A * | 4/1994 | Groen et al. | 416/102 |
| 5,330,322 A | 7/1994 | Aubry | |
| 5,372,478 A | 12/1994 | McCafferty | |
| 5,372,479 A | 12/1994 | Byrnes et al. | |
| 5,562,416 A * | 10/1996 | Schmaling et al. | 416/134 A |
| 5,620,305 A | 4/1997 | McArdle | |
| 5,798,494 A | 8/1998 | Aoyama et al. | |
| 5,820,344 A | 10/1998 | Hamilton et al. | |
| 6,024,325 A * | 2/2000 | Carter, Jr. | 244/17.25 |
| 6,050,778 A | 4/2000 | McArdle et al. | |
| 6,695,583 B2 | 2/2004 | Schmaling et al. | |
| 7,097,169 B2 | 8/2006 | Mueller | |
| 7,695,249 B2 | 4/2010 | Krauss et al. | |
| 2002/0109042 A1 | 8/2002 | Byrnes et al. | |
| 2003/0235499 A1 | 12/2003 | Schmaling | |

FOREIGN PATENT DOCUMENTS

| | | |
|---|---|---|
| WO | WO9734799 | 9/1997 |
| WO | WO201068209 A1 | 6/2010 |

* cited by examiner

ROTOR WITH BLADES INCLUDING OUTER BLADE SHELL AND INNER STRUCTURAL MEMBER

FIELD OF INVENTION

The subject matter disclosed herein relates generally to the field of bearingless rotors for use in aircraft, and more particularly to a rotor with blades including an outer blade shell surrounding an inner structural member for use in a helicopter.

DESCRIPTION OF RELATED ART

A rotor for use in an aircraft, such as a helicopter, includes a central rotating hub having a plurality of blade receiving sockets disposed about the hub. Blades, each blade having a shank located at its base, are held in respective blade receiving sockets, with the shanks being inserted into the blade receiving sockets. The blades rotate with the hub during operation. The blade receiving sockets and the blade shanks may be provided with opposed, separated ball bearing race surfaces, and a plurality of metallic ball bearings that are held between the blade receiving socket and the blade shank on the race surfaces. The metallic ball bearings allow adjustment of the pitch of the blades. However, use of metallic ball bearings to attach the blades to the rotor hub may result in a relatively heavy rotor assembly.

In order to reduce rotor weight, bearingless rotors have been developed. Bearingless rotor designs may utilize a flexible structural member, commonly termed a flexbeam or flexbeam connector, for retention of helicopter rotor blades to the central hub. The use of a flexbeam, which is typically comprised of fiber reinforced resin matrix materials, reduces the weight, complexity, and maintenance of the rotor assembly, while improving the reliability and damage tolerance thereof. However, basic operational constraints of rotary wing flight impose substantial functional complexity upon the rotor flexbeam, necessitated by the need to accurately control the displacement of the rotor blades in multiple directions, i.e., flapwise and edgewise bending, and torsional or pitch change motions. The geometric constraints of such a bearingless rotor configuration may require a relatively large inboard blade size, both in chord and in thickness.

BRIEF SUMMARY

According to one aspect of the invention, a rotor for use in an aircraft includes an inner hub; and a plurality of blades arranged around the inner hub, each of the plurality of blades comprising an inner structural member; an outer blade shell surrounding the inner structural member; and a centering block located at a base of the inner structural member proximal to the inner hub, wherein the centering block is located between a first lateral portion of the inner structural member and a second lateral portion of the inner structural member, wherein the centering block is further connected to the outer blade shell, and wherein the centering block allows the outer blade shell to rotate about an axis approximately corresponding to the inner structural member.

According to another aspect of the invention, a blade for use in an aircraft rotor includes an inner structural member; an outer blade shell surrounding the inner structural member; and a centering block located at a base of the inner structural member, wherein the centering block is located between a first lateral portion of the inner structural member and a second lateral portion of the inner structural member, wherein the centering block is further connected to the outer blade shell, and wherein the centering block allows the outer blade shell to rotate about an axis approximately corresponding to the inner structural member.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of a rotor with blades including an outer blade shell surrounding an inner structural member are provided, with exemplary embodiments being discussed below in detail. The blades, including the inner structural members and outer aerodynamic blade shells, are arranged around a central hub. The blade components are attached to the hub using centering blocks that include cylindrical bearings that allow the outer blade shell to move to adjust the pitch of the blade. By tailoring the elastic properties of the inner structural member relative to the outer blade shell, a rotor configuration is obtained which provides enhanced structural efficiency, reducing the rotor size, and decreasing the rotor weight. The decreased rotor weight may be particularly beneficial for helicopter rotor systems that include counter rotating coaxial rotors on a single shaft axis. Load sharing between the inner structural member and the outer blade shell reduces the necessary size of the outer blade shell and improves the lift/drag (L/D) ratio of the rotor as compared to other rigid bearingless rotor designs. Load sharing also decreases the size of the cylindrical bearings and improves packaging constraints of the rotor system.

Figure 1:
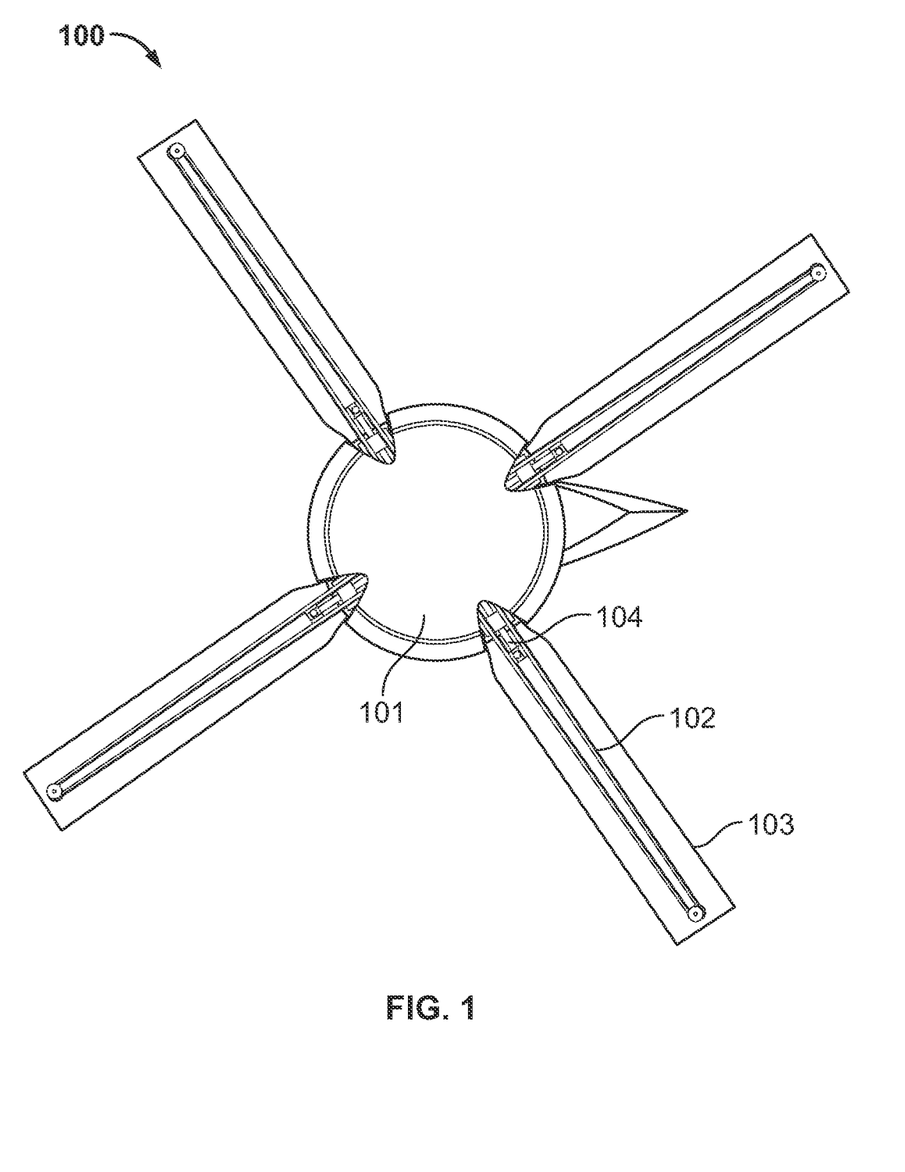
FIG. 1 illustrates a top view of an embodiment of a rotor with blades including an outer blade shell surrounding an inner structural member, with a detailed view of the inner configuration of the blades.

FIG. 1 illustrates a top view of an embodiment of a rotor with blades including an outer blade shell surrounding an inner structural member, and shows a detailed view of the inner configuration of the blades. Central hub fairing 101 is located at the center of the rotor 100, and a plurality of blades are arranged around the central hub fairing 101. Each of the blades includes an inner structural member 102 that is located inside of an aerodynamic outer blade shell 103. Outer blade shell 103 is transparent in FIG. 1 to illustrate the configuration of the inner structural member 102 located inside the outer blade shell 103. The outer blade shell 103 is the structural spar of a blade assembly. This spar may have additional components bonded to it to provide an optimal aerodynamic shape in some embodiments, particularly in the region where the spar overlaps the inner structural member. A centering block 104 is located at a base of each inner structural member 102 and respective outer blade shell 103, at an attachment point to an inner hub located inside of the central hub fairing 101. The inner structural members 102 may be made from composite materials that are flexible in one axis and stiff in the other axes. In operation, blade centrifugal force, and some of the blade bending moment, is transmitted to the inner hub located inside of central hub fairing 101 via the inner structural member 102. Blade torsional load, most of the chordwise moment, and the balance of the flapwise movement are reacted at supports for the cylindrical bearings that attach the centering block 104 to outer structural member 103.

Figure 2:
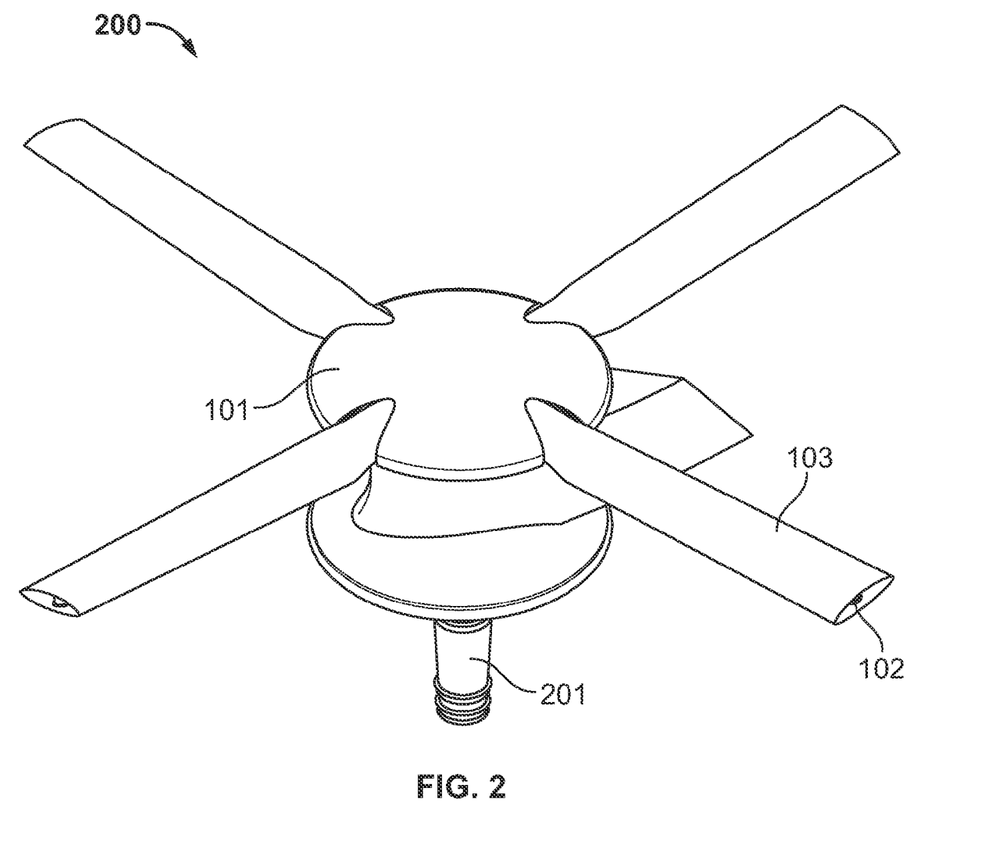
FIG. 2 illustrates a perspective view of an embodiment of a rotor with blades including an outer blade shell surrounding an inner structural member.

FIG. 2 illustrates a perspective view 200 of an embodiment of a rotor with the inner sections of the blades shown, including an outer blade shell surrounding an inner structural member. The central hub fairing 101 has blades including outer blade shells 103 arranged around it. The central hub fairing 101 is located on central shaft axis 201 that rotates the central hub fairing 101 and its associated blades during operation. Inner structural members 102 are visible through a cutout at the end of outer blade shells 103 in FIG. 2; however, in operation, an outer blade shell 103 extends past and completely covers its respective inner structural member 102.

Figure 3:
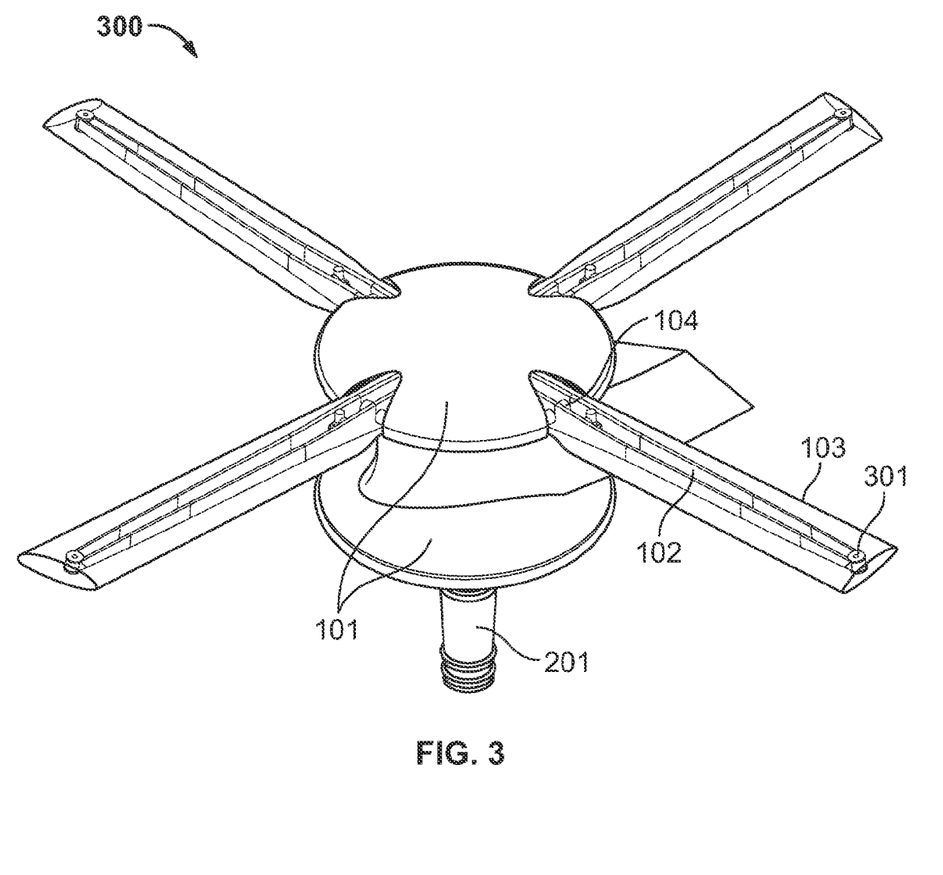
FIG. 3 illustrates a perspective view of an embodiment of a rotor with blades including an outer blade shell surrounding an inner structural member, with a detailed view of the inner configuration of the blades.

FIG. 3 illustrates a perspective view of an embodiment of a rotor with blades including an outer blade shell surrounding an inner structural member, with a detailed view of the inner configuration of the blades. The blades are arranged around central hub fairing 101, which is located on central shaft axis 201. The inner structural members 102 are located inside of respective outer blade shells 103. The centering blocks 104 are located at the base of the inner structural member 102 at a connection point to the inner hub that is located inside the central hub fairing 101. The centering blocks 104 connect the outer blade shells 103 to the inner hub located inside of central hub fairing 101. Each inner structural member 102 is connected to its outer blade shell 103 at a distal connection point 301, which may include a fastener that extends vertically from the top of the outer blade shell 103 through a hole in the inner structural member to the bottom of the outer blade shell 103.

Figure 4:
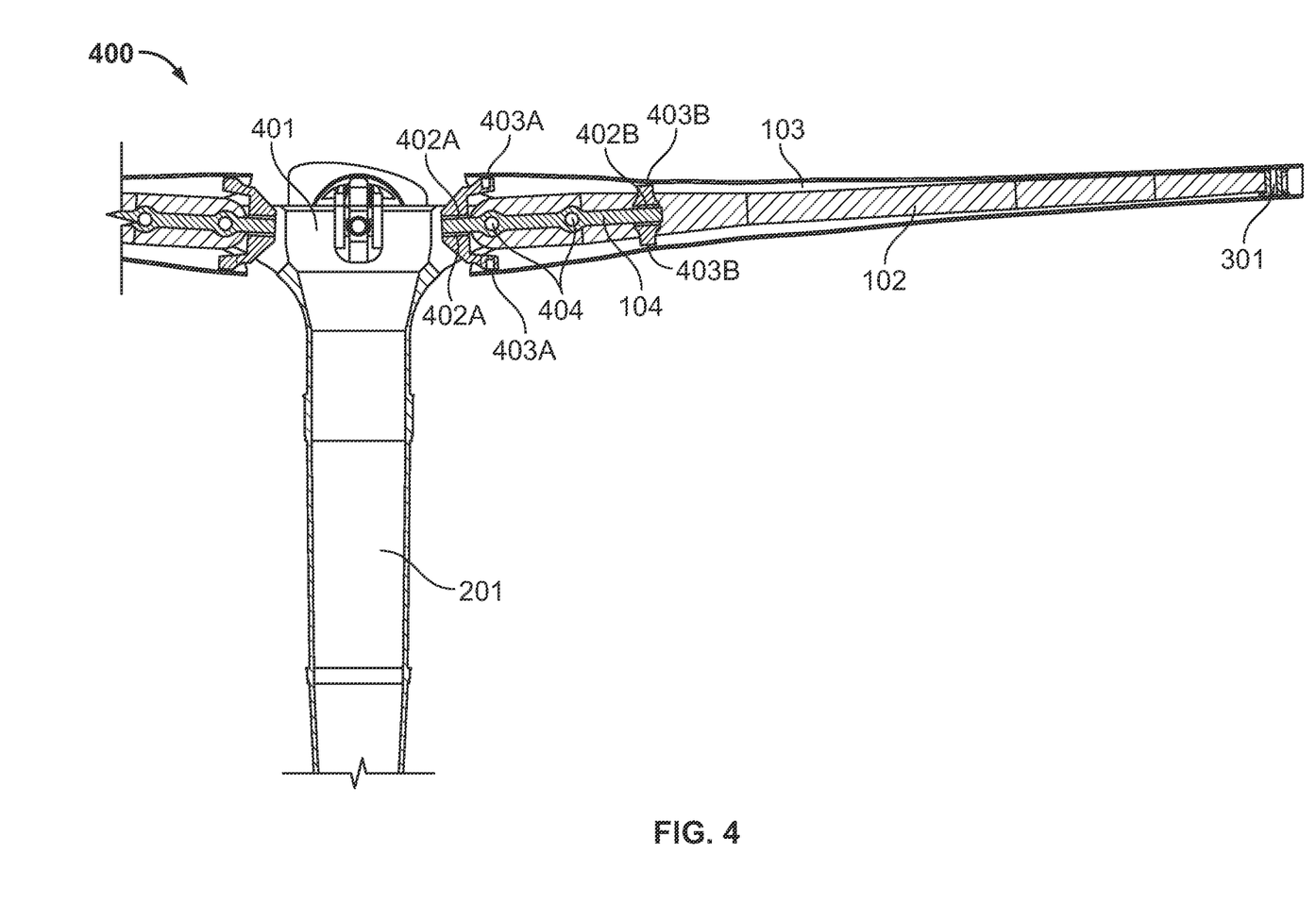
FIG. 4 illustrates a side-view cross-section of a rotor with blades including an outer blade shell surrounding an inner structural member.

FIG. 4 illustrates a side-view cross-section of a rotor with blades including an outer blade shell surrounding an inner structural member, and shows a detailed view of a centering block 104. The central shaft axis 201 is connected to the inner hub 401 (which is located inside of central hub fairing 101 as shown in FIGS. 1-3), and the blades extend outward from the inner hub 401. Each blade includes an inner structural member 102 located inside of outer blade shell 103. The centering blocks 104 are located at the base of the inner structural members 102 at the connection points to the inner hub 401, and act to hold the inner structural members 102 in place with respect to the inner hub 401, and also to attach the outer blade shells 103 to the inner hub 401. The centering block 104 is connected to the inner structural member 102 by bolts that extend horizontally through centering block bolt holes 404. The centering block 104 also includes cylindrical bearings 402A and 402B. The cylindrical bearings 402A-B each include a plurality of bearing elements held in a race that allow the cylindrical bearings 402A-B to rotate about an axis approximately corresponding to the length of the body of the centering block 104. The bearing elements may be a lightweight material such as Teflon in some embodiments, or may be elastomeric in other embodiments. The centering block 104 is connected to the outer blade shell 103 at outer blade shell connection points 403A and 403B. Top and bottom outer blade shell connection points 403A are located above and below cylindrical bearing 402A, proximal to hub 401. Top and bottom outer blade shell connection points 403A are located above and below cylindrical bearing 402B, farther away from the hub 401. The cylindrical bearing 402A-B allow the flexible outer blade shell 103 to rotate about an axis approximately corresponding to the inner structural member 102 for pitch adjustment during operation of the rotor, while the body of centering block 104 and the bolts in centering block bolt holes 404 hold the base of the inner structural member 102 in place with respect to the inner hub 401. Inner structural member 102 comprises a flexible material, allowing the portion of the inner structural member 102 located between bolt holes 404 and distal connection point 301 to twist with the rotation of the outer blade shell 103 during pitch adjustment of the blade. The outer blade shell 103 is connected to inner structural member 102 at distal connection point 301 by fasteners, which may be bolts, extending from the top and bottom of the outer blade shell 103 in a direction that is approximately perpendicular to the bolts that are located in centering block cylindrical bearing holes 404 when the pitch of outer blade shell is not being adjusted.

Figure 5:
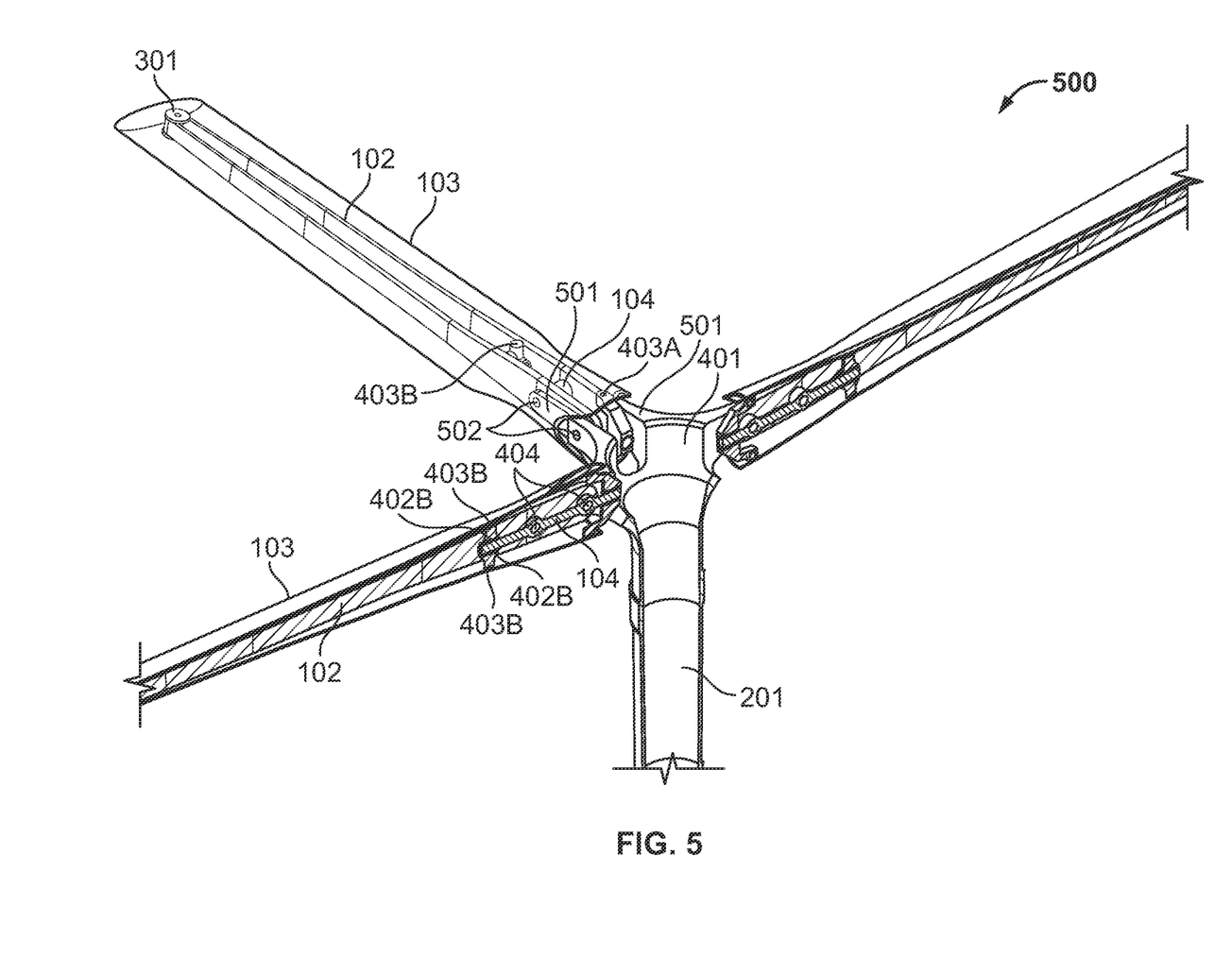
FIG. 5 illustrates another perspective view cross-section of a rotor with blades including an outer blade shell surrounding an inner structural member, with a detailed view of a blade connection point on the inner hub.

FIG. 5 illustrates another perspective, cross-section view of a rotor with blades including an outer blade shell surrounding an inner structural member, and shows a detailed view of connection point between a blade and the inner hub 401. The central shaft axis 201 is connected to the inner hub 401 (which is located inside of hub fairing 101 as shown in FIGS. 1-3), and the blades extend outward from the inner hub 401. Each blade includes an inner structural member 102 located inside of outer blade shell 103, and the centering block 104 that is connected to the inner structural member 102 by bolts that extend horizontally through centering block bolt holes 404. The centering block 104 also includes the cylindrical bearings 402A-B, and outer blade shell connection points 403A-B located above and below the cylindrical bearings 402A-B that connect the centering block 104 to the outer blade shell 103. FIG. 5 shows the details of the connection points between the centering block 104, inner structural member 102, and the inner hub 401 at blade connection point 501, which is part of inner hub 401. Blade connection point 501 includes two lateral portions that are configured to receive the base of inner structural member 102 between the two lateral portions of the blade connection point 501. The inner structural member 102 also includes two lateral portions, and a centering block 104 is located between the two lateral portions of inner structural member 102. Two bolts extend horizontally through bolt holes 502 in the first lateral portion of blade connection point 501, the first lateral portion of inner structural member 102, centering block bolt holes 404, the second lateral portion of inner structural member 102, and the bolt holes 502 second lateral portion of blade connection point 501, and act to hold the inner structural member in place with respect to inner hub 401. In operation, blade centrifugal force, and some of the blade bending moment, is transmitted to the inner hub 401 via the inner structural member 102. Blade torsional load, most of the chordwise moment, and the balance of the flapwise movement are reacted at the bolts through bolt holes 502 in the centering block 104.

Figure 6:
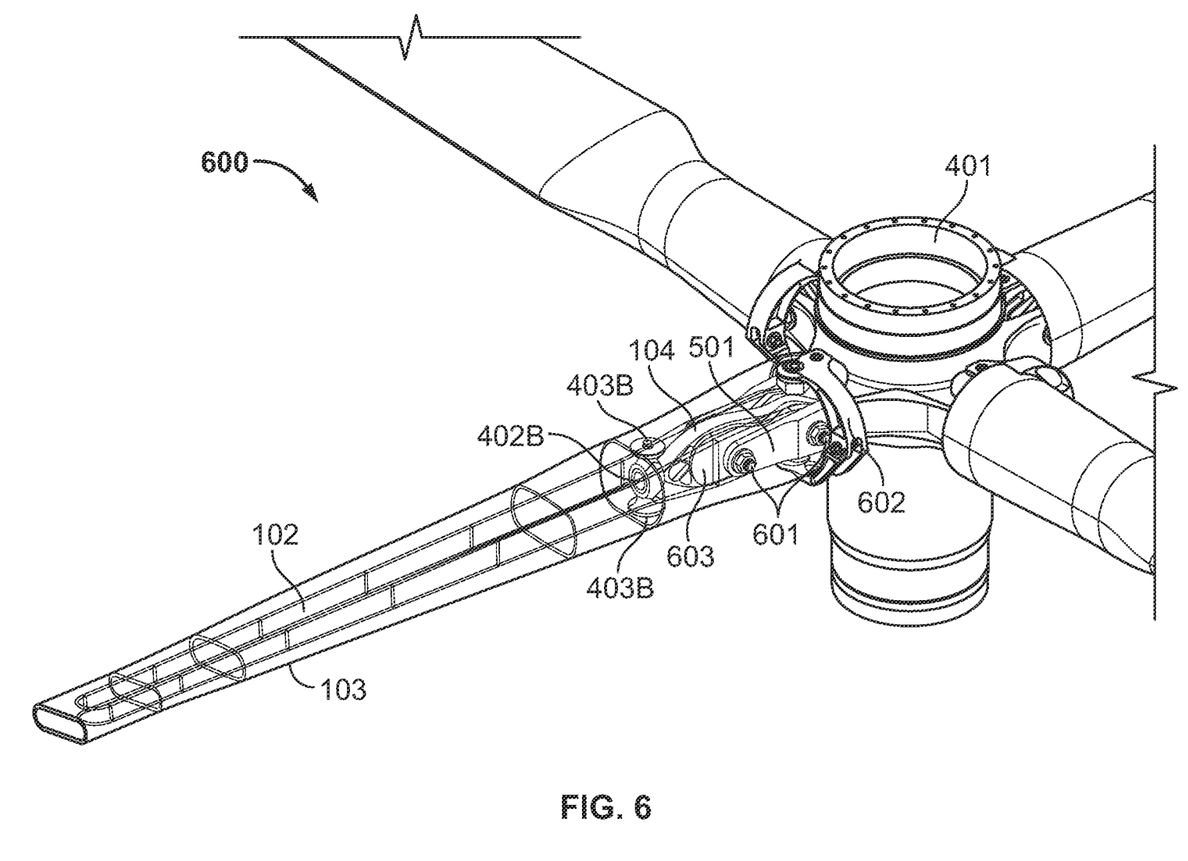
FIG. 6 illustrates another perspective view of a rotor with blades including an outer blade shell surrounding an inner structural member, with a detailed view of the inner configuration of the blades.

FIG. 6 illustrates another perspective view of a rotor with blades including an outer blade shell surrounding an inner structural member and a pitch horn 602. The pitch horn 602 rotates the outer blade shell 103 for pitch adjustment. The blades extend outward from the inner hub 401. Each blade includes an inner structural member 102 located inside of outer blade shell 103, and the centering block 104 that is connected to the inner structural member 102 by bolts that extend horizontally through centering block bolt holes 404. The centering block 104 includes the cylindrical bearings 402A (shown above with respect to FIGS. 4-5) and 402B, and outer blade shell connection points 403A (shown above with respect to FIGS. 4-5) and 403B that connect the centering block 104 to the outer blade shell 103. Two bolts 601 extend horizontally through the in the first lateral portion of blade connection point 501, the first lateral portion of inner structural member 102, centering block bolt holes 404, the second lateral portion of inner structural member 102, and the bolt holes 502 on second lateral portion of blade connection point 501, and act to hold the inner structural member in place with respect to inner hub 401.

Figure 7:
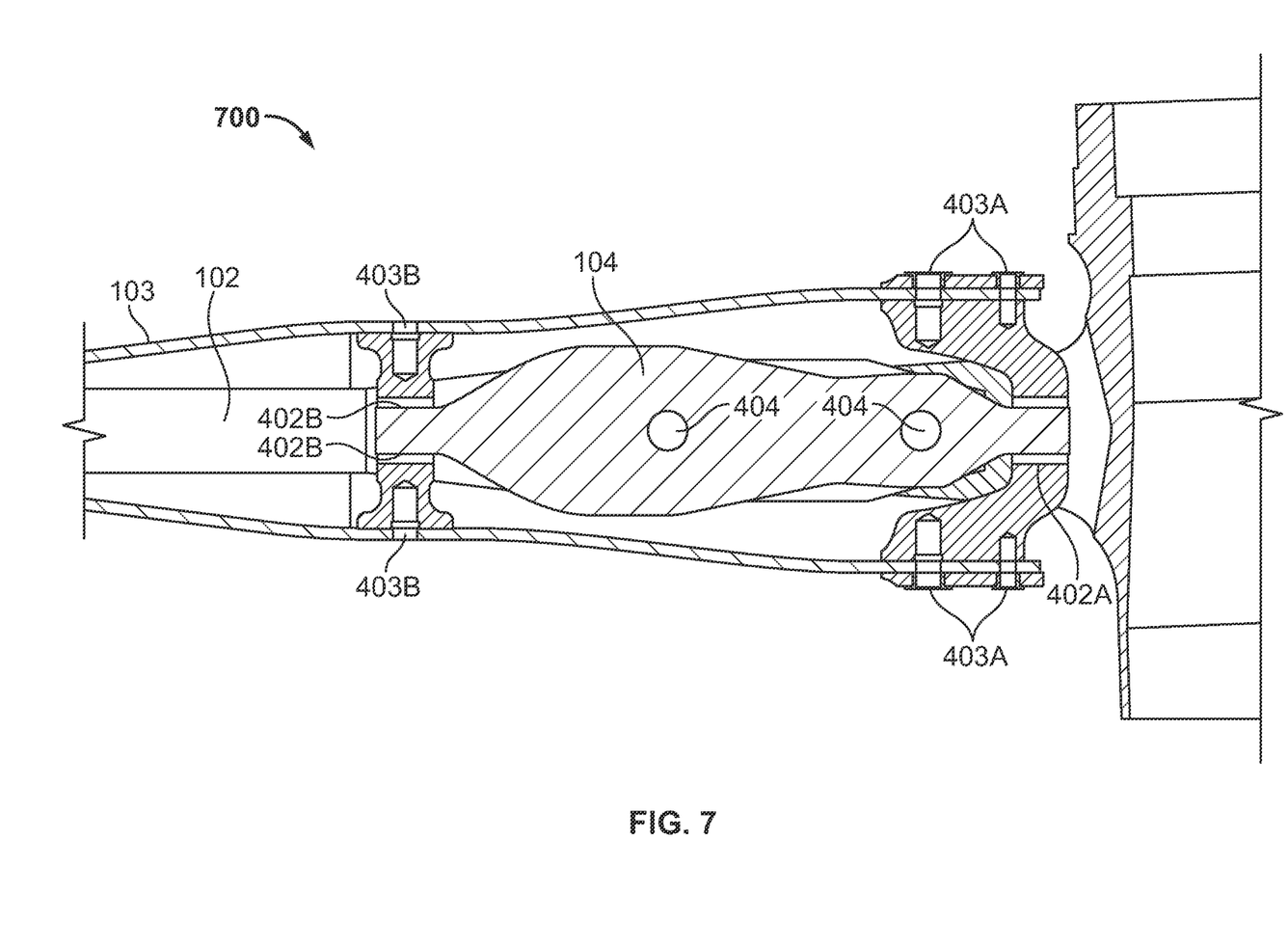
FIG. 7 illustrates a detailed cross-section view of an embodiment of a centering block.

FIG. 7 illustrates a cross sectional view of an embodiment of a centering block. The centering block includes cylindrical bearings 402A-B, which rotate about the main body of the centering block 104 through the movement of a plurality of bearing elements held in respective races. The bearing elements held in the races of cylindrical bearings 402A-B may be a lightweight material such as Teflon in some embodiments, or may be elastomeric in other embodiments. The outer shell connection points 403A-B attach the centering block 104 to the outer blade shell 103, and the rotation of cylindrical bearings 402A-B allows pitch of the blade shell to adjust. A pitch horn 602, such as was shown in FIG. 6, may connect to the outer shell connection points 403A at the top and bottom of the outer blade shell 103 proximal to the hub. Bolts in bolt holes 404 connect the centering block 104 to the inner structural member 102 and the blade connection point 501.

Figure 8:
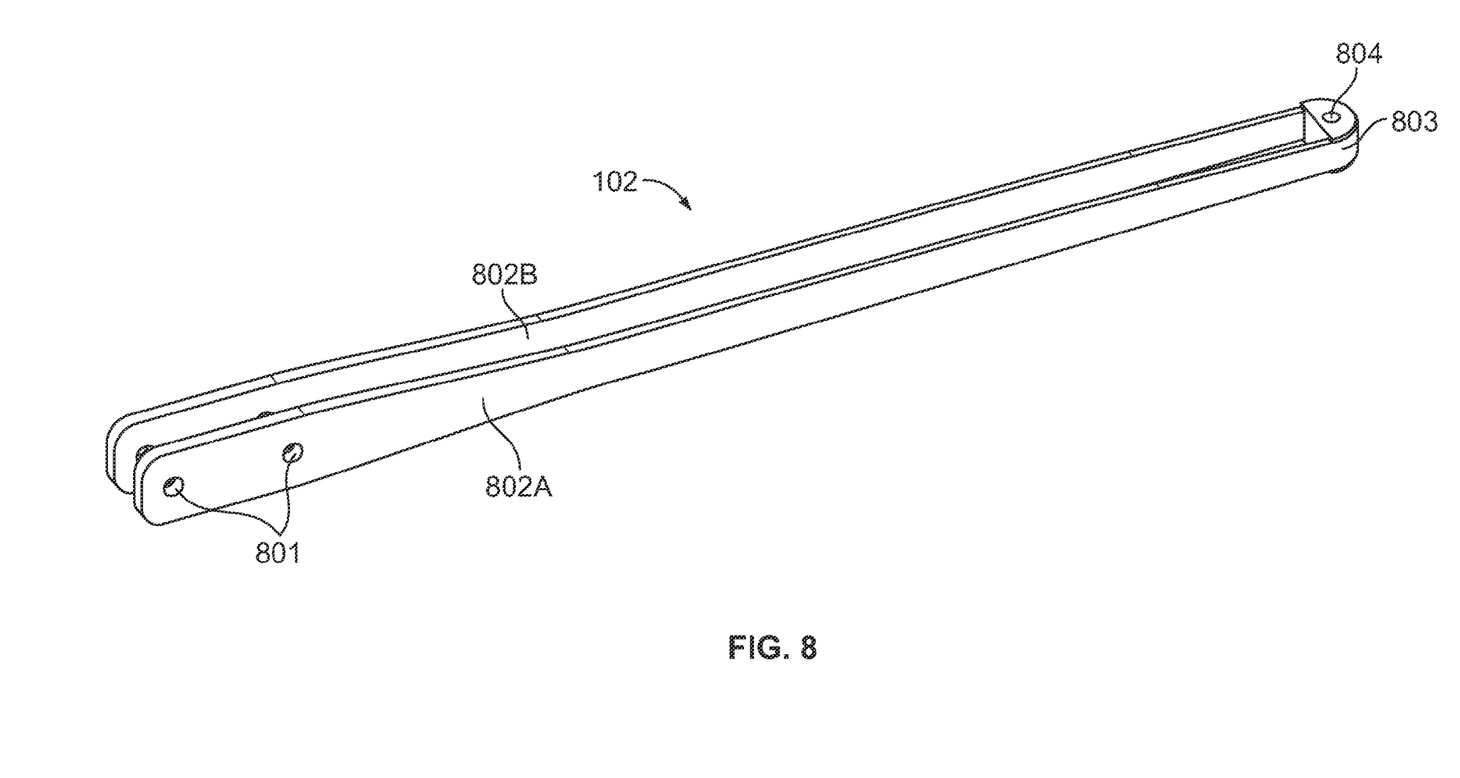
FIG. 8 illustrates a perspective view of an embodiment of an inner structural member for use in a rotor with blades including an outer blade shell surrounding an inner structural member.

FIG. 8 illustrates an embodiment of an inner structural member 102 for use in a rotor with blades including an outer blade shell surrounding an inner structural member. The inner structural member 102 includes lateral portions 802A-B, connected by a curved end portion 803 that curves around a distal connection point having a mounting hole 804. The inner structural member 102 also includes proximal bolt holes 801 in its base portion, with pairs of corresponding proximal bolt holes 801 being located opposite each other on the two lateral portions 802A-B. In the rotor assembly, a centering block 104 is located between the lateral structural portions 801A-B (as shown above with respect to FIGS. 1-5), and the proximal bolt holes 801 correspond to the centering block bolt holes 404 on the centering block 104 (as shown in FIGS. 4-5). The bolts that hold the inner structural member 102 to the centering block 104 each go through a proximal bolt hole 801 on a first of the lateral portions 802A-B, through a centering block bolt hole 404 in centering block 104, and through the corresponding proximal bolt hole 801 on the second of the lateral portions 802A-B of inner structural member 102 (as shown in FIG. 5 with respect to bolt holes 502). The distal mounting hole 804 located at the end of inner structural member 102 corresponds to distal connection point 301 shown in FIGS. 3-5. Fasteners, which may include bolts, holding the outer blade shell 103 to inner structural member 102 at distal connection point 301 extends from the top and bottom of the outer blade shell 103, into distal mounting hole 804. The base of inner structural member 102 is held in place with respect to the inner hub 401 by the centering blocks and the bolts located in proximal bolt holes 801. The portion of inner structural member 102 located between its base and distal mounting hole 804 may twist as the outer blade shell 103 that surrounds the inner structural member 102 rotates about an axis approximately corresponding to the inner structural member 102 to adjust the pitch of the rotor blade during operation.

While two centering block bolt holes 404, each with a corresponding pair of proximal bolt holes 801 in inner structural member 102 and a corresponding pair of bolt holes in blade connection point 501, are shown in FIGS. 1-7, any appropriate number of bolts with corresponding bolt holes may attach an inner structural member 102, centering block 104, and blade connection point 501. Further, while one distal mounting hole 804 is shown corresponding to distal connection point 301, any appropriate number of fasteners with corresponding mounting holes may attach the inner structural member 102 to the outer blade shell 103 at the distal connection point 301. The number of blades in the rotors of FIGS. 1-7 is also shown for illustrative purposes only; the number of blades in a rotor with blades including an outer blade shell surrounding an inner structural member may be any appropriate number.

Figure 9:
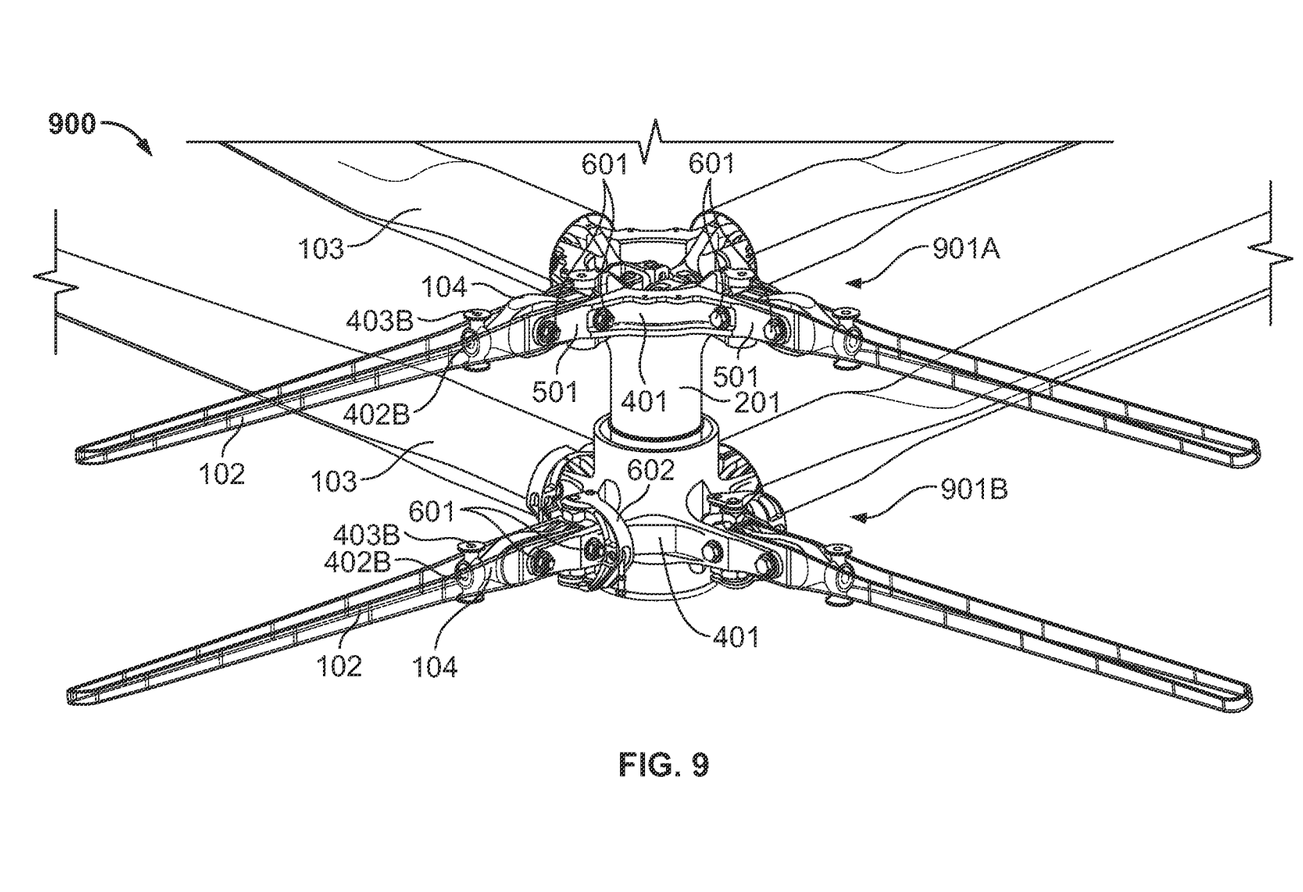
FIG. 9 illustrates an embodiment of a helicopter rotor assembly including dual coaxial rotors with blades including an outer blade shell surrounding an inner structural member on a central shaft axis.

FIG. 9 illustrates an embodiment of a helicopter rotor assembly 900 including counter rotating coaxial rotors on a single shaft axis, the rotors each having blades including an outer blade shell surrounding an inner structural member, as described above with respect to FIGS. 1-8. The helicopter rotor assembly 900 shown in FIG. 9 may be used in a helicopter rotor system that includes counter rotating coaxial rotors on a single shaft axis. Central shaft axis 201 connects bottom rotor 901B and top rotor 901A. Each rotor 901A-B includes a plurality of blades extending outward from respective inner hubs 401 (which may be covered by a central hub fairing 101 as shown in FIGS. 1-3). Each blade includes an inner structural member 102 covered by an outer blade shell 103 (some outer blade shells are not shown in FIG. 9 to allow internal elements to be visible). Each inner structural member 102 is connected to an inner hub 401 at a blade connection point 501, and a centering block 104 is located at the base of each inner structural member 102 to hold the inner structural member 102 in place with respect to the inner hub 401, and to attach outer blade shell 103 to the inner hub 401. Bolts 601 in centering block bolt holes 404 connect the inner structural member 102 to the centering block 104 and the blade connection point 501. The centering block includes cylindrical bearings 402A-B, which rotate about the main body of the centering block 104 and allow pitch adjustment of the blades. The outer shell connection points 403A-B attach the centering block 104 to the outer blade shell 103, and the rotation of cylindrical bearings 402A-B allows the blade shell to adjust in pitch. The lower rotor 901B includes a pitch horn 602 on each blade; the pitch horn 602 causes the outer blade shell 103 to rotate for pitch adjustment. The dual rotor configuration of helicopter rotor assembly 900 particularly benefits from incorporation of relatively lightweight rotors 901A-B; however, a rotor having blades including an outer blade shell surrounding an inner structural member may be incorporated into an aircraft having any appropriate rotor configuration and number of rotors.

The technical effects and benefits of exemplary embodiments include a relatively lightweight rotor system with enhanced structural efficiency for use in a helicopter.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A rotor for use in an aircraft comprising:
   an inner hub; and
   a plurality of blades arranged around the inner hub, each of the plurality of blades comprising:
      an inner structural member;
      a structural outer blade shell surrounding the inner structural member;
      a centering block located at a base of the inner structural member proximal to the inner hub, wherein the centering block is located between a first lateral portion of the inner structural member and a second lateral portion of the inner structural member, wherein the centering block is further connected to the outer blade shell, wherein the centering block is connected to the outer blade shell by at least two bearings having a common axis of rotation, the base of the inner structural member fastened directly to the inner hub, and
      wherein the centering block allows the inboard portion of the structural outer blade shell to rotate about a single axis approximately corresponding to the inner structural member, an inboard portion of the outer blade shell rotatable about the single axis relative to both the centering block and the inboard portion of the base of the inner structural member proximal to the inner hub;
      wherein the first lateral portion of the inner structural member and the second lateral portion of the inner structural member extend from the base of the inner structural member and beyond the centering block in a direction towards an outboard end of the outer blade shell.

2. The rotor of claim 1, wherein the inner structural member comprises a composite material.

3. The rotor of claim 1, wherein the outer blade shell comprise a composite material.

4. The rotor of claim 1, wherein the centering block is connected to the outer blade shell via a first cylindrical bearing and a second cylindrical bearing, the first cylindrical bearing and the second cylindrical bearing being located at opposite ends of the centering block.

5. The rotor of claim 4, wherein the outer blade shell is connected to the centering block at a plurality of outer blade shell connection points that are located above and below each of the first and second cylindrical bearings.

6. The rotor of claim 1, wherein the centering block is attached to the base of the inner structural member by at least one bolt, wherein the at least one bolt extends from the first lateral portion of the inner structural member, through the centering block, to the second lateral portion of the inner structural member.

7. The rotor of claim 6, wherein the inner hub comprises a plurality of blade connection points for connecting the plurality of blades to the inner hub, each of the plurality of blade connection points comprising a first lateral portion and a second lateral portion.

8. The rotor of claim 7, wherein the inner structural member is located between the first lateral portion and the second lateral portion of the blade connection point, and wherein the at least one bolt extends from the first lateral portion of the blade connection point, through the first lateral portion of the inner structural member, the centering block, and the second lateral portion of the inner structural member, to the second lateral portion of the blade connection point.

9. The rotor of claim 1, further comprising a distal connection point between the inner structural member and the outer blade shell, the distal connection point being located at an end of the inner structural member that is opposite to the base of the inner structural member.

10. The rotor of claim 1, wherein, for each of the plurality of blades, the outer blade shell is a structural spar of the blade.

11. The rotor of claim 5, wherein a pitch horn is attached to an exterior of the outer blade shell at the outer blade shell connection points that are located above and below the first cylindrical bearing, such that, based on the pitch horn causing the outer blade shell to rotate about the axis approximately corresponding to the inner structural member, the first and second cylindrical bearings rotate to allow the pitch adjustment of the blade based on the rotation of the outer blade shell.

12. The rotor of claim 1, wherein the centering block and inner structural member are connected by at least one bolt to a blade connection point of the inner hub.

13. A blade for use in an aircraft rotor, comprising:
   an inner structural member;
   a structural outer blade shell surrounding the inner structural member; and
   a centering block located at a base of the inner structural member proximal to the inner hub, wherein the centering block is located between a first lateral portion of the inner structural member and a second lateral portion of the inner structural member, wherein the centering block is further connected to the outer blade shell, wherein the centering block is connected to the outer blade shell by at least two bearings having a common axis of rotation, the base of the inner structural member fastened directly to the inner hub, and
   wherein the centering block allows the inboard portion of the structural outer blade shell to rotate about a single axis approximately corresponding to the inner structural member, an inboard portion of the outer blade shell rotatable about the single axis relative to both the centering block and the inboard portion of the base of the inner structural member proximal to the inner hub;
   wherein the outer blade shell is a structural spar of the blade;
   wherein the first lateral portion of the inner structural member and the second lateral portion of the inner structural member extend from the base of the inner structural member and beyond the centering block in a direction towards an outboard end of the outer blade shell.

14. The blade of claim 13, wherein the centering block comprises a first cylindrical bearing and a second cylindrical bearing, the first cylindrical bearing and the second cylindrical bearing being located at opposite ends of the centering block.

15. The blade of claim 14, wherein the outer blade shell is connected to the centering block at a plurality of outer blade shell connection points that are located above and below each of the first and second cylindrical bearings.

16. The blade of claim 13, wherein the centering block is attached to the base of the inner structural member by at least one bolt, wherein the at least one bolt extends from the first lateral portion of the inner structural member, through the centering block, to the second lateral portion of the inner structural member.

17. The blade of claim 13, further comprising a distal connection point between the inner structural member and the outer blade shell, the distal connection point being located at an end of the inner structural member that is opposite to the base of the inner structural member.

18. The blade of claim 17, wherein a portion of the inner structural member that is located between the distal connection point and the base of the inner structural member is configured to twist during rotation of the outer blade shell for pitch adjustment of the blade.

19. The blade of claim 13, further comprising a pitch horn located externally to the outer blade shell and proximal to the inner hub, wherein the pitch horn partially surrounds the outer blade shell, and wherein the pitch horn causes the outer blade shell to rotate about the axis approximately corresponding to the inner structural member for pitch adjustment of the blade.

20. The rotor of claim 19, wherein a portion of the inner structural member that is located between the distal connection point and the base of the inner structural member is configured to twist during the rotation of the outer blade shell by the pitch horn for pitch adjustment of the blade.

21. A rotor for use in an aircraft comprising:
an inner hub; and
a plurality of blades arranged around the inner hub, each of the plurality of blades comprising:
an inner structural member;
a structural outer blade shell surrounding the inner structural member;
a centering block located at a base of the inner structural member proximal to the inner hub, wherein the centering block is located between a first lateral portion of the inner structural member and a second lateral portion of the inner structural member, wherein the centering block is further connected to the outer blade shell, wherein the centering block is connected to the outer blade shell by at least two bearings having a common axis of rotation, the base of the inner structural member fastened directly to the inner hub, and
a distal connection point between the inner structural member and the outer blade shell, the distal connection point being located at an end of the inner structural member that is opposite to the base of the inner structural member;
wherein the centering block allows the inboard portion of the structural outer blade shell to rotate about a single axis approximately corresponding to the inner structural member, an inboard portion of the outer blade shell rotatable about the single axis relative to both the centering block and the inboard portion of the base of the inner structural member proximal to the inner hub;
wherein the centering block is connected to the outer blade shell via a first cylindrical bearing and a second cylindrical bearing, the first cylindrical bearing and the second cylindrical bearing being located at opposite ends of the centering block;
wherein the outer blade shell is connected to the centering block at a plurality of outer blade shell connection points that are located above and below each of the first and second cylindrical bearings;
wherein the centering block is attached to the base of the inner structural member by at least one bolt, wherein the at least one bolt extends from the first lateral portion of the inner structural member, through the centering block, to the second lateral portion of the inner structural member;
wherein the inner hub comprises a plurality of blade connection points for connecting the plurality of blades to the inner hub, each of the plurality of blade connection points comprising a first lateral portion and a second lateral portion;
wherein the inner structural member is located between the first lateral portion and the second lateral portion of the blade connection point, and wherein the at least one bolt passes through the first lateral portion of the blade connection point, through the first lateral portion of the inner structural member, the centering block, and the second lateral portion of the inner structural member, through the second lateral portion of the blade connection point;
wherein the first lateral portion of the inner structural member and the second lateral portion of the inner structural member extend from the base of the inner structural member and beyond the centering block in a direction towards an outboard end of the outer blade shell.

* * * * *